United States Patent

Kendall

[15] 3,668,759

[45] June 13, 1972

[54] CASSETTE HUB LEADERING HEAD

[72] Inventor: Trevor William Kendall, Ronkonkoma, N.Y.

[73] Assignee: Dictaphone Corporation, Bridgeport, Conn.

[22] Filed: March 12, 1970

[21] Appl. No.: 18,863

[52] U.S. Cl. ................................29/200 B, 83/277, 83/580, 83/926

[51] Int. Cl. ........................................................B23p 19/00

[58] Field of Search..............242/74; 29/200 B; 83/277, 925, 83/926, 902, 580, 701

[56] References Cited

UNITED STATES PATENTS

| | | | |
|---|---|---|---|
| 1,269,368 | 6/1918 | Beardsley | 83/277 X |
| 2,519,552 | 8/1950 | Eller | 83/277 X |

*Primary Examiner*—James M. Meister
*Attorney*—Curtis, Morris & Safford and Arthur V. Smith

[57] ABSTRACT

A device is provided for securing a length of leader tape from a supply thereof to a reel hub having a slot on its peripheral side wall. The hub is initially positioned on the base of the device with a segment of a leadering tape positioned adjacent the slot. A pair of spaced die members are mounted on the base and have vertically aligned apertures therein through which a supply of frangible rod is advanced. A shearing blade is slidably mounted in the device for movement between the die members and is reciprocated by an air cylinder between extended and retracted positions. Upon movement of the blade from its retracted position to its extended position, the blade shears the portion of the frangible rod between the die members and forces the sheared rod portion, with the tape adjacent the hub, into the slot in the reel hub.

6 Claims, 7 Drawing Figures

INVENTOR

BY

ATTORNEY

INVENTOR.
Trevor William Kendall

BY

INVENTOR.

BY

INVENTOR.
BY Trevor William Kendall

CASSETTE HUB LEADERING HEAD

BRIEF SUMMARY OF THE INVENTION

The present invention relates to a tape leadering apparatus and more particularly to a device for attaching a leader tape to the hub of a tape cassette.

The principal object of this Leadering Head is to provide a mechanism to attach a leader tape onto a cassette hub, to trim the tape once it is attached to the hub. These objectives are achieved by a mechanism consisting of a plunger arm which slides through guides blocks, to shear a pinning rod, from a supply thereof, and insert the sheared section into a recess in the cassette hub. Once the plunger cuts the rod, the rod is forced into a slot in the cassette hub by the plunger arm in its forward motion and thus is pinned in the slot rigidly along with the leader tape, FIG. 6. The latter is previously manually placed in position adjacent the hub. While pinning the rod, the leader tape is cut at one end by the sharp edge of a shearing blade on the plunger arm, FIG. 6 and FIG. 3. Then the plunger arm recedes, and during its receding motion the plunger moves the swinging feeder arm down. The feeder arm in its downward motion advances an excess of the required length of pinning rod which would be sheared to the precise length by the shearing blade in the plunger arm in its next forward motion. During the forward motion of the plunger arm the feeder arm, upwardly. The set up of pawl and leafspring in the feeder arm allows the pinning rod to move downward only and NOT upward.

The above and other objects, features and advantages of this invention will be apparent in the following detailed description of an illustrative embodiment thereof which is to be read in connection with the accompanying drawings, wherein.

DETAILED DESCRIPTION

Figure 1:
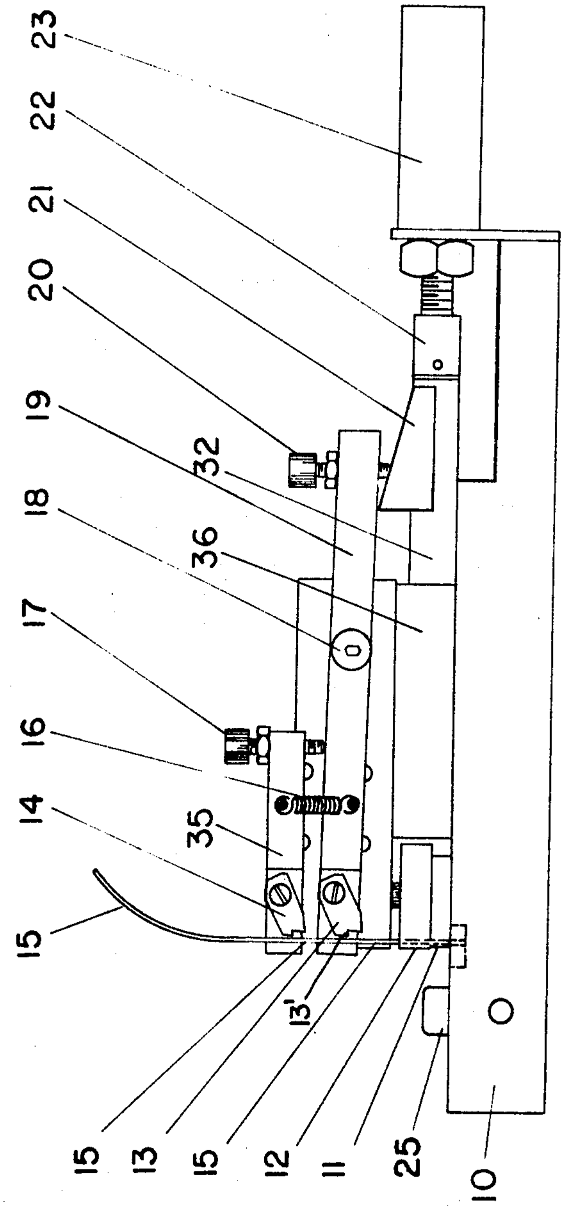
FIG. 1 is a side elevational view of a Leadering Head constructed in accordance with a preferred embodiment of the present invention, with the plunger arm nearing the end of its retracted position, the left end of the feeder arm in its upward position, and about to swing down.
Figure 3:
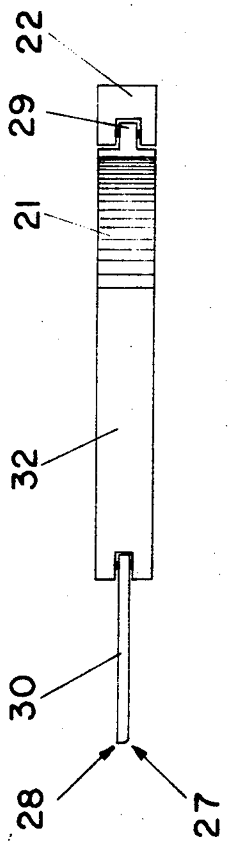
FIG. 3 is an enlarged top plan view of the plunger arm.
Figure 4:
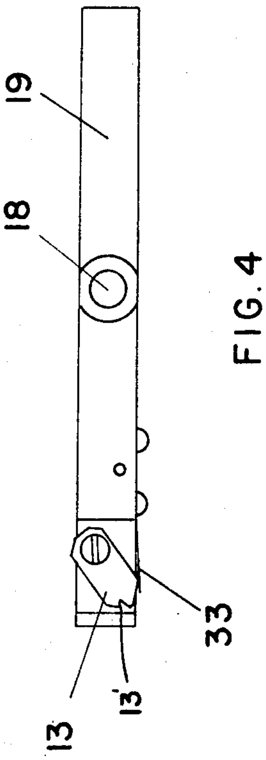
FIG. 4 is an enlarged side view of the swinging feeder arm with its pawl and leafspring.
Figure 5:
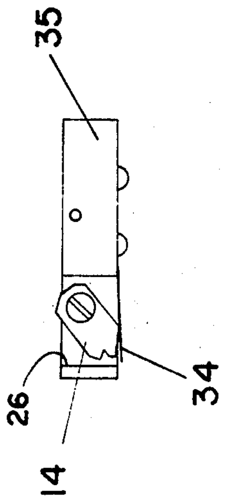
FIG. 5 is an enlarged side view of the stationary feeder arm with its pawl and leafspring.

Referring to the drawings in detail, it will be seen that the principal components of the leadering head device of the present invention, comprise a plunger arm 32, FIG. 3, having a shearing blade 30, and cam, 21, FIG. 3 and FIG. 1; a swinging or pivotally mounted arm, 19, FIG. 4; a stationary feeder arm 35 rigidly mounted above arm 18, FIGS. 1 and 5 and an air cylinder 23, FIG. 1 for reciprocating plunger 32.

Plunger Arm 32, as seen in FIG. 3, includes a shearing blade 30, at its forward end, which blade has a sharp edge 28 and a rounded off edge 27. The cam 21 (FIG. 3 and FIG. 1) is rigidly connected to arm 32 and is an important part of the plunger arm, in that it cooperates with feed arm 19, as more fully described hereinafter, to advance a supply of pinning rod into position.

Plunger arm 32 is coupled to the air cylinder 23, by means of a block 22, threadedly connected to the actuator rod of the air cylinder, and a clevis coupling 29 (FIGS. 1 and 3) for selective reciprocation thereby.

Feeder arm 18, FIGS. 1 and 4, is pivotally mounted on the device at 18, and thus its free ends are capable of swinging up and down. Downward motion of the left end of the feeder arm is caused by cam 21, as it is moved to the right by cylinder 23, because of the engagement of cam 21 and a screw 20 secured in arm 19. The extent of downward motion of or arcuate feeder arm 19 is adjustable by the screw,20.

Upward motion of the left end of the feeder arm is caused by the spring 16 which is connected between stationary arm 35 and pivoted arm 19. The extent to which the left end of arm 19 may move upwardly is limited by screw 17. A pivotally mounted pawl 13, having a serrated front edge 13, and a leaf spring 33, FIG. 4, are mounted at the left end of arm 18 for up and down movement therewith.

Pawl 13 and leafspring 33 do not allow the pinning rod 15 to move up when the left end of the feeder arm is pulled up by spring 16. However when the feeder arm moves down, the pinning rod is advanced by the sharp serrated edge of pawl 13. This is a generally conventional feed arrangement, as is well known to those skilled in mechanical arts.

Figure 2:
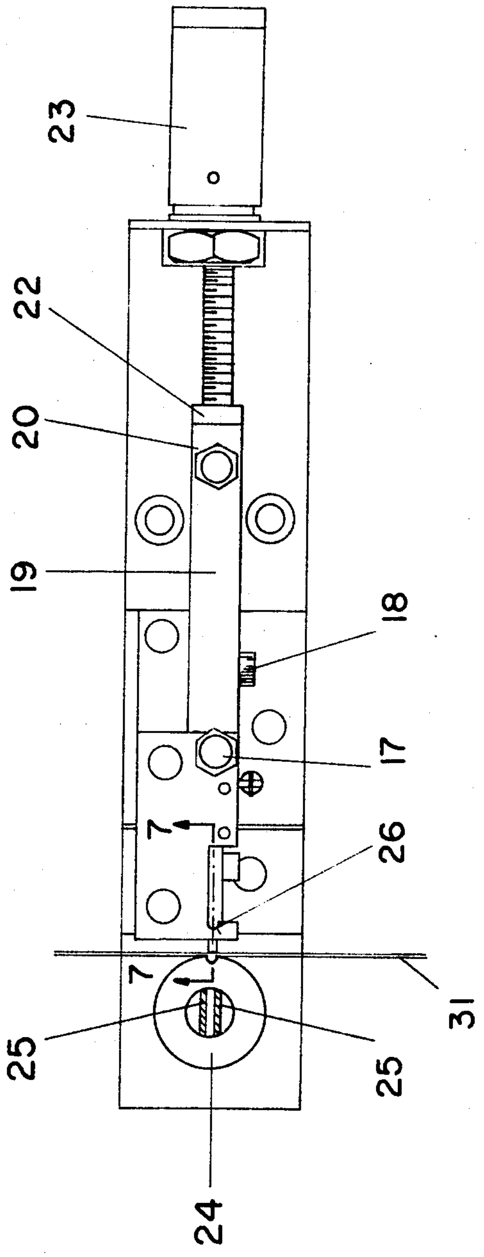
FIG. 2 is a top plan view of the Leadering Head, illustrated in FIG. 1, but with the plunger arm in its forward position after having sheared the pinning rod and inserted it in the slot of the hub together with the leader tape.
Figure 7:
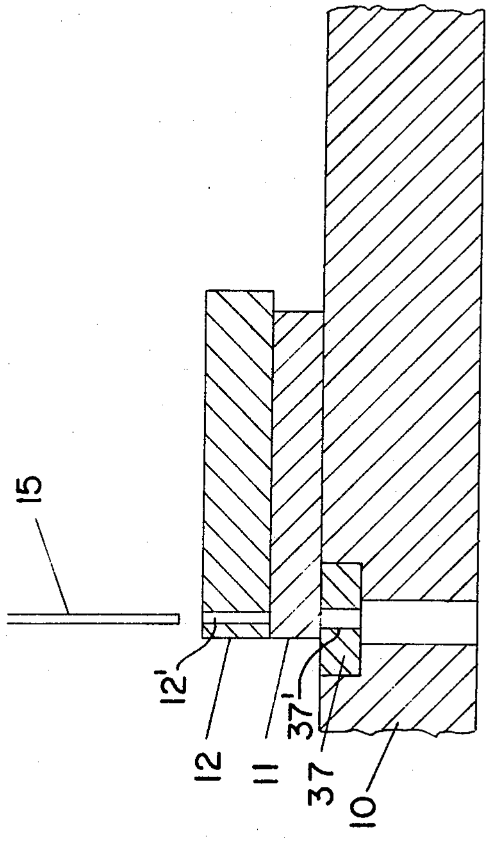
FIG. 7 is an enlarged sectional view taken along line 7—7 of FIG. 2.

Stationary feeder arm 35 also serves the same purpose of allowing rod 15 to move downward only and prevent the said rod from moving upward. This is accomplished by means of the pivotally mounted pawl 14 and the leaf spring 34. Pinning rod 15 runs through inlet 26, FIG. 2, formed at the left end of arm 35, past pawl 14 and lower die 37, FIG. 7. The length of the pinning rod passing through the lower die, 37, can be adjusted by means of the screws 17 and 20.

Figure 6:
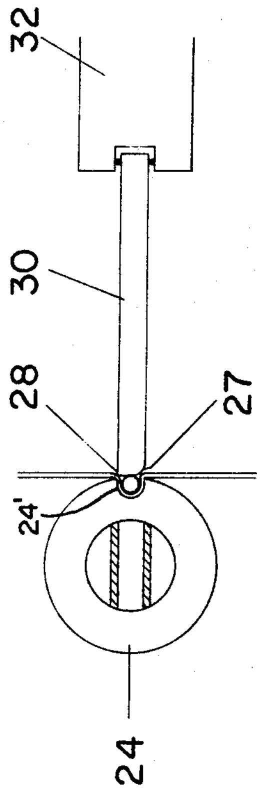
FIG. 6 is an enlarged plan view of the shearing blade of the plunger arm as it simultaneously pins the rod and trims the leader tape.

The operation of the Leadering Head is as follows. Air cylinder 23, is activated by depressing a button. The plunger arm 32 is thus forced to move forward (to the left) by the air cylinder. The said plunger arm therefore moves along a groove provided in the block 36 and then in the groove or slot of the guide 11. Shearing blade 30 (FIGS. 3 and 6) shears the pinning rod 15 between dies 12 and 37 and inserts the sheared portion of the rod into the slot 24 of the cassette hub 24 which is held in the position hole 12′ in an upper die 12. From die 12 the rod passes between the slot formed in guide 11 and then through the hole 37′ in shown by FIGS. 5 and 6, i.e. with slot 24′ facing blade 30, by hub holder 25. The rod is thus pinned in the slot 24′ together with the leader tape 31. The latter may be manually inserted between hub 24 and block 11 before actuation of cylinder 23, as would be obvious to one skilled in the art. The tape may be course be stored on a supply reel adjacent the leadering device to provide a constant supply of tape to the hubs. Since one corner 28 of blade 30 is sharp, it cuts the leader tape at that end. The other corner of the leader tape is left free, (FIG. 6) to provide a leader tape portion on the hub. As the plunger arm moves forward, the left end of the feeder arm 19 goes up under the influence of spring 16. During this upward motion of the feeder arm the pawl 13 does not advance pinning rod 15. After the pinning operation cylinder 23 is reversed and plunger arm arm recedes back, towards the right. In this backward motion cam 21 of the plunger arm pushes screw 20 upwardly thereby causing feeder arm 19 to move downwardly at the left end. As the feeder arm moves down pawl 13 advances pinning rod 15 down through guide 11 and into lower die 37. The length of the rod that is sheared is exactly equal to the height of the guide 11. The excess length of rod below the guide 11 falls down as waste through the lower die 37. During this portion of the operation, i.e. as plunger 32 is retracted, a predetermined length of tape is drawn past the new hub so that a length 31′ thereof extends beyond the hub to form a leader after the tape is cut by blade 30.

On pressing the start button once again the plunger arm 32 moves forward to shear, insert and pin rod 15 in the slot 24′ of the cassette hub. The process is thus repeated.

Although an illustrative embodiment of the present invention has been described herein with reference to the accompanying drawings, it is to be understood that the invention is not limited to that precise embodiment, and that various charges and modifications may be effected therein by one skilled in the art without departing from the scope or spirit of this invention.

I claim:

1. A device for securing a length of leader tape from a supply thereof to a reel hub having a slot on its peripheral side wall wherein said tape is initially positioned adjacent said slot, said device comprising, a base, a pair of spaced die members mounted on said base having aligned apertures therein, a shearing blade slidably mounted in said device for movement between said die members, means for reciprocating said blade between extended and retracted positions between said die members, means for advancing a rod formed of frangible material through the apertures in said dies as said reciprocating means moves said blade to its retracted position so that a portion of said rod spans the space between said dies, means for mounting a reel hub adjacent said dies at the location of the extended position of said blade with the slot in its peripheral side wall opening towards the space between said die members, whereby upon movement of said blade from its retracted position, towards its extended position, said blade shears the portion of said rod between said die members and forces the sheared rod portion, with said tape, into the slot in said reel hub.

2. The device as defined in claim 1 wherein said shearing blade has a pair of spaced parallel edges at its forward ends, extending generally perpendicularly of the tape, with one of said edges being rounded and the other of said edges being sharpened, whereby said sharpened edge cuts said tape as the blade is moved to its extended position by said reciprocating means.

3. The device as defined in claim 2 wherein said advancing means includes an elongated arm pivotally mounted on said device, a pawl member pivotally mounted on said one end, said pawl member having a serrated edge for engaging said rod, a leaf spring mounted on said arm for biasing said serrated edge into engagement with said rod, means normally biasing said one arm end in a raised position with respect to said dies, and means operably interconnecting said arm and said means for reciprocating the blade for lowering said one arm end against the bias of said biasing means, with respect to said dies, as said blade moves from its extended to its retracted position, whereby engagement of said serrated pawl edge with said rod and downward movement of said one arm end advances said rod through the aligned apertures in said dies.

4. The device as defined in claim 3 wherein said reciprocating means comprises an air cylinder mounted on said base and having an actuator-plunger arm connected to said blade and said means for lowering said one arm end comprises a cam and cam follower cooperating between said actuator-plunger and said other arm end.

5. The device as defined in claim 4 wherein said biasing means comprises a spring secured at one end to said one arm end and at its other end to a fixed arm on said device.

6. The device as defined in claim 4 including stop means on said fixed arm for limiting upward movement of said one arm end.

* * * * *